(12) United States Patent
Zhou et al.

(10) Patent No.: US 12,379,599 B2
(45) Date of Patent: Aug. 5, 2025

(54) LIGHT GUIDE AND NEAR-EYE DISPLAY APPARATUS

(71) Applicant: HUAWEI TECHNOLOGIES CO., LTD., Guangdong (CN)

(72) Inventors: Haifeng Zhou, Dongguan (CN); Liming Liu, Dongguan (CN); Ziqian Ding, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/508,930

(22) Filed: Nov. 14, 2023

(65) Prior Publication Data

US 2024/0077736 A1 Mar. 7, 2024

Related U.S. Application Data

(63) Continuation of application No. PCT/CN2022/093392, filed on May 17, 2022.

(30) Foreign Application Priority Data

May 19, 2021 (CN) .......................... 202110546093.8

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0036* (2013.01); *G02B 2027/0178* (2013.01)

(58) Field of Classification Search
CPC .................................................. G02B 6/0016
See application file for complete search history.

(56) References Cited

U.S. PATENT DOCUMENTS

| 8,160,411 B2 | 4/2012 | Levola et al. |
| 8,254,031 B2 | 8/2012 | Levola |

(Continued)

FOREIGN PATENT DOCUMENTS

| CN | 111221064 A | 6/2020 |
| CN | 212515221 U | 2/2021 |
| WO | 2018178626 A1 | 10/2018 |

OTHER PUBLICATIONS

Extended European Search Report in European Appln. No. 22803979.8, mailed on Oct. 1, 2024, 7 pages.

(Continued)

*Primary Examiner* — William Boddie
*Assistant Examiner* — Bipin Gyawali
(74) *Attorney, Agent, or Firm* — Fish & Richardson P.C.

(57) ABSTRACT

The present disclosure relates to light guides and near-eye display apparatuses. One example light guide includes a light guide plate and a two-dimensional grating that is disposed on a surface of the light guide plate. The two-dimensional grating includes a plurality of grating units arranged in a planar shape, the grating units are arranged at an interval of a first distance along a first direction and at an interval of a second distance along a second direction, and the first direction intersects with the second direction. The two-dimensional grating includes a light egress area and a light ingress area that are arranged along a third direction, and a fourth direction is perpendicular to the third direction.

20 Claims, 10 Drawing Sheets

(56) References Cited

U.S. PATENT DOCUMENTS

| | | | |
|---|---|---|---|
| 8,320,032 B2 | 11/2012 | Levola | |
| 8,508,848 B2 | 8/2013 | Saarikko | |
| 8,593,734 B2 | 11/2013 | Laakkonen | |
| 9,187,175 B1 * | 11/2015 | Chen | B64C 39/005 |
| 9,513,480 B2 | 12/2016 | Saarikko et al. | |
| 9,753,297 B2 | 9/2017 | Saarikko et al. | |
| 9,791,703 B1 | 10/2017 | Vallius et al. | |
| 10,393,930 B2 | 8/2019 | Tervo | |
| 2008/0138024 A1 * | 6/2008 | Parker | G02B 6/0053 |
| | | | 385/130 |
| 2010/0079865 A1 | 4/2010 | Saarikko et al. | |
| 2011/0310396 A1 * | 12/2011 | Tamiya | G01D 5/38 |
| | | | 356/498 |
| 2014/0140654 A1 * | 5/2014 | Brown | G02B 27/0172 |
| | | | 385/10 |
| 2019/0285891 A1 * | 9/2019 | Lam | G02F 1/133526 |
| 2020/0116997 A1 | 4/2020 | Lee et al. | |
| 2020/0264367 A1 * | 8/2020 | Huang | G02B 27/0081 |
| 2020/0341280 A1 * | 10/2020 | Bablumyan | G02B 5/32 |
| 2022/0137278 A1 * | 5/2022 | Lee | G02B 5/3016 |
| | | | 359/489.15 |
| 2023/0075954 A1 * | 3/2023 | Levola | G02B 27/1086 |
| 2023/0324595 A1 * | 10/2023 | Drazic | G02B 27/0081 |
| | | | 385/37 |

OTHER PUBLICATIONS

International Search Report and Written Opinion in International Appln. No. PCT/CN2022/093392, mailed on Jul. 28, 2022, 18 pages (with English translation).

* cited by examiner

LIGHT GUIDE AND NEAR-EYE DISPLAY APPARATUS

CROSS-REFERENCE TO RELATED APPLICATIONS

This application is a continuation of International Patent Application No. PCT/CN2022/093392, filed on May 17, 2022, which claims priority to Chinese Patent Application No. 202110546093.8, filed on May 19, 2021. The disclosures of the aforementioned applications are hereby incorporated by reference in their entireties.

TECHNICAL FIELD

This application relates to the field of optical devices and optical technologies, and in particular, to a light guide and a near-eye display apparatus.

BACKGROUND

Vision is the most primary sense organ for humans to obtain external information. In recent years, many near-eye display apparatuses have emerged in academic and industrial communities. Although technical means are not exactly the same, the near-eye display apparatuses keep being optimized and evolving along a direction toward user experience. This mainly includes: increasing a field of view, improving resolution, improving a color gamut, extending an eye box, and the like. The field of view (FOV) is increased mainly by improving a light guide, where the FOV is a range of a virtual picture visible to a user.

Generally, the range of the virtual picture visible to the user increases as the FOV increases. Therefore, for a purpose of confining light rays having a plurality of colors to a light guide and increasing the FOV, currently a relatively intuitive approach is as follows: the light guide includes a plurality of light guide plates, and each light guide plate performs transmission in a small spectral range. However, a disadvantage of this approach is that, a quantity of light guide plates of the light guide is multiplied, causing an increase in costs and a weight of the light guide. In addition, an assembly process is relatively complex, and does not suite a requirement for implementing a near-eye display apparatus having a very simple shape.

SUMMARY

This application provides a light guide and a near-eye display apparatus, to increase a field of view that can be supported by the light guide and simplify a structure of the light guide.

According to a first aspect, this application provides a light guide. The light guide includes a light guide plate and a two-dimensional grating. The two-dimensional grating is specifically disposed on a surface of the light guide plate, and may form an integrated structure together with the light guide plate. The two-dimensional grating includes a plurality of grating units arranged in a planar shape. Specifically, the grating units are arranged at an interval of a first distance along a first direction, and are arranged at an interval of a second distance along a second direction. The first direction intersects with the second direction. The two-dimensional grating includes a light egress area and a light ingress area that are arranged along a third direction. A fourth direction is perpendicular to the third direction. It may be considered that the third direction is a y-axis direction in a rectangular coordinate system, and the fourth direction is an x-axis direction in the rectangular coordinate system. The first direction, the second direction, the third direction, and the fourth direction are located on a same plane, and any two of the directions do not overlap. In other words, the first direction and the second direction each are at a specific included angle with coordinate axes of the rectangular coordinate system. The included angle is not 0° and not 90°. The grating unit is configured to diffract one incident light beam into at least three emergent light beams.

In this technical solution, a grating unit in the light ingress area of the light guide receives a light ray, and the grating unit is configured to diffract one incident light beam into at least three emergent light beams. The light ray is expanded inside the light guide plate by the grating unit, and emitted out of a grating unit in the light egress area. In this solution, after the light ray is emitted to the grating unit, the grating unit diffracts one incident light beam into at least three emergent light beams for transmission. Specifically, one incident light beam may be diffracted into four emergent light beams, five emergent light beams, six emergent light beams, or the like. This is not limited in this application. In conclusion, there are a plurality of transmission paths for a light ray incident into the light guide; a part of a field of view may be allowed to escape from the light guide during transmission on a main path; and a compensation path is used to compensate for the field of view that escaped from the light guide, so that transmission with a relatively large field of view may be supported by using one light guide plate. To be concise, the light guide in this solution can perform transmission with a relatively large field of view, and a structure of the light guide is relatively simple.

During specific disposition of the two-dimensional grating, the arranged grating unit of the two-dimensional grating may generate a first grating vector, a second grating vector, and a plurality of combined grating vectors. The first grating vector is perpendicular to the first direction, the second grating vector is perpendicular to the second direction, and the combined grating vector is a vector sum of the first grating vector at a diffraction order M1 and the second grating vector at a diffraction order M2. The diffraction order M1 and the diffraction order M2 are integers, and each may be a positive integer, a negative integer, or zero. Their specific values are not limited in this application. A grating unit in the light ingress area receives a light ray, and the light ray is expanded inside the light guide plate by the grating unit and emitted out of a grating unit in the light egress area. After being emitted to the grating unit, the light ray is transmitted under the effect of the first grating vector, the second grating vector, and the combined grating vector. A vector sum of the grating vectors of the light ray during the transmission is zero. Specifically, a quantity of combined grating vectors of the grating unit is not limited, and there may be a plurality of combined grating vectors. Therefore, the first grating vector, the second grating vector, and the combined grating vectors may form a plurality of optical transmission paths. When the light ray is emitted to the grating unit, the light ray may be diffracted into at least three emergent light beams that are formed under the influence of the first grating vector, the second grating vector, and the combined grating vectors. A part of a field of view may be allowed to escape from the light guide during transmission on a main path; and a compensation path is used to compensate for the field of view that escaped from the light guide, so that transmission with a relatively large field of view may be supported by using one light guide plate. To be concise, the light guide in this solution can perform transmission with a relatively field of view, and a structure of the light guide is relatively simple.

During specific arrangement of a position of the grating unit, an included acute angle between the first direction and the fourth direction may be between 10° and 80°, and an included acute angle between the second direction and the fourth direction may be between 10° and 80°.

During specific disposition of the light guide, the first direction and the second direction, along which the grating units are arranged, are symmetrical relative to the third direction. In other words, the first direction and the second direction face two sides of the third direction, and an included angle between the first direction and the third direction is equal to an included angle between the second direction and the third direction. In this solution, a manner of arranging the grating units is relatively regular, and directions of the first grating vector, the second grating vector, and the combined grating vectors are relatively symmetric and regular, making it relatively easy for a vector sum of grating vectors used for grooming during transmission of a light ray to become zero.

In a specific technical solution, a structure of the grating unit is properly designed, so that the diffraction order M1 includes −3, −2, −1, 0, 1, 2, and 3, and the diffraction order M2 includes −3, −2, −1, 0, 1, 2, and 3. The diffraction orders in this solution are diffraction orders in a wave vector space, and the diffraction orders are relatively high, so that a plurality of combined grating vectors are formed, to obtain a compensation path meeting a compensation requirement.

Using the light guide in the technical solutions of this application can support transmission of a picture with a field of view of at least 60°, so as to improve a field of view of a near-eye display apparatus in which the light guide is used, thereby improving user experience.

During specific disposition of the two-dimensional grating, the two-dimensional grating includes at least two sub-areas, where grating units in neighboring sub-areas have different forms, and grating units in a same sub-area have a same form. In this solution, different diffraction orders may be obtained by properly designing the forms of the grating units, to design a proper main path and a proper compensation path.

In addition, during specific disposition of the two-dimensional grating, the plurality of grating units of the two-dimensional grating may alternatively have a same form. In other words, all grating units disposed on a surface of the light guide plate have a same form, so as to simplify a preparation process of the light guide.

It is worth noting that, in embodiments of this application, for the two-dimensional grating disposed on the surface of the light guide plate, the two-dimensional grating may be located on a surface of and on a same side of the light guide plate; or some areas of the two-dimensional grating may be located on a surface on one side, and remaining areas of the two-dimensional grating may be located on a surface on another side.

The two-dimensional grating may further include at least two sub-areas, the first distances of neighboring sub-areas are different, and the second distances of the neighboring sub-areas are different. In other words, different sub-areas have different grating periodicities, so that different grating vectors are formed, to increase selectable grating vectors.

In a specific technical solution, the two-dimensional grating may include a first sub-area and a second sub-area, the light ingress area and the light egress area are located in the first sub-area, the second sub-area is located on a side that is of the light egress area and that is away from the light ingress area, the first distance of the first sub-area is greater than the first distance of the second sub-area, and the second distance of the first sub-area is greater than the second distance of the second sub-area. In other words, a grating periodicity of the second sub-area is less than a grating periodicity of the first sub-area. This solution can reduce an energy loss of a light ray in the light guide, thereby improving light ray transmission efficiency of the light guide.

The first distance may be specifically between 200 nm and 600 nm, and the second distance may be specifically between 200 nm and 600 nm; and values of the first distance and the second distance may be set based on an actual requirement. This is not limited in this application.

According to a second aspect, this application further provides a near-eye display apparatus. The near-eye display apparatus includes a housing, an optical receiver/transmitter, and the light guide in any one of the foregoing technical solutions. The optical receiver/transmitter and the light guide are disposed at the housing; and the optical receiver/transmitter is configured to generate a light ray, and emit the generated light ray to a light ingress area of the light guide. The near-eye display apparatus in this solution has a relatively large field of view and a relatively compact structure to help implement miniaturization.

A specific type of the near-eye display apparatus is not limited, and may be virtual reality glasses or augmented reality glasses. Any near-eye display apparatus that needs to use the light guide for transmission of a picture shall fall within the protection scope of this application.

During specific disposition of the optical receiver/transmitter, the optical receiver/transmitter may include a laser, a scanner, and a controller. The scanner of the optical receiver/transmitter is configured to: scan an incident ray emitted by the laser, and send the incident ray to the light ingress area of the light guide.

A specific type of the optical receiver/transmitter is not limited, either. For example, the optical receiver/transmitter may be a liquid crystal on silicon optical receiver/transmitter, or a digital light processing optical receiver/transmitter.

The light ray generated by the optical receiver/transmitter includes red light, green light, and blue light. The light guide in this solution can implement propagation of a picture having three colors with a large field of view, and has a relatively simple structure.

REFERENCE NUMERALS

Figure 1:
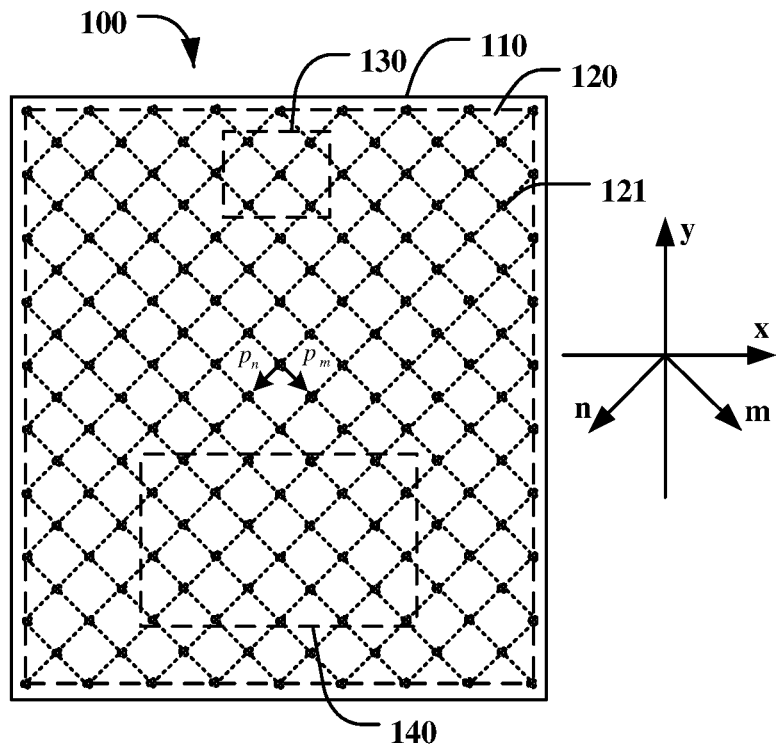
FIG. 1 is a schematic front view of a structure of a light guide according to an embodiment of this application.

100: light guide; 110: light guide plate;
120: two-dimensional grating; 121: grating unit;
130: light ingress area; 140: light egress area;
150: first sub-area; 160: second sub-area;
01: picture; 011: field of view of red light;
012: field of view of green light; 013: field of view of blue light;
200: housing; 210: leg of glasses;
220: frame of glasses; 300: optical receiver/transmitter;
310: laser; 320: scanner.

DESCRIPTION OF EMBODIMENTS

Terms used in the following embodiments are merely intended to describe specific embodiments, but not to limit this application. The terms "one", "a type", "the", "the foregoing", "this", and "the one" in a singular form as used in the specification and appended claims of this application are intended to also include expressions such as "one or more", unless otherwise specified clearly in the context.

Reference to "an embodiment", "a specific embodiment", or the like described in this specification indicates that one or more embodiments of this application include a specific feature, structure, or characteristic described with reference to the embodiment. The terms "include", "contain", "have", and their variants all mean "include but are not limited to", unless otherwise especially emphasized.

For ease of understanding a light guide and a near-eye display apparatus provided in embodiments of this application, the following first describes an application scenario of the light guide and the near-eye display apparatus. As a main component of a near-eye display apparatus, a light guide has a relatively great influence on performance of the near-eye display apparatus; and most importantly, increasing a field of view that can be supported by the light guide plays a decisive role in increasing a size of a picture that can be transmitted by the near-eye display apparatus. A colored picture usually includes red light, green light, and blue light. Wavelengths of light with different colors are different, and transmission paths of light with different colors are also different in a waveguide. In a conventional technology, to ensure a relatively large field of view, a light guide needs to include at least two light guide plates 110 having gratings, to work together to ensure complete transmission of a picture corresponding to the three colors of light. In this solution, a cost is relatively high, a structure of the light guide is relatively complex, and a relatively large amount of space is occupied. This is not conducive to simplifying a structure of the near-eye display apparatus, and is not conducive to promoting miniaturization of the near-eye display apparatus. Therefore, this application provides a light guide and a near-eye display apparatus, so that one light guide having a grating may be used for transmission of a picture, thereby simplifying a structure of the light guide, reducing a cost, and increasing a field of view. The following describes structures of the light guide and the near-eye display apparatus in embodiments of this application by enumerating specific embodiments.

Figure 2:
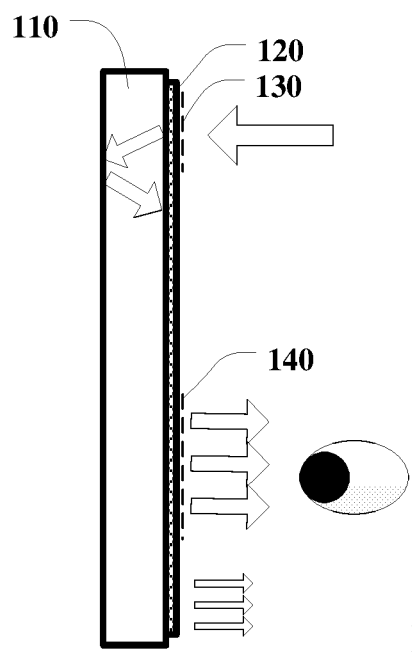
FIG. 2 is a schematic diagram of a lateral structure of a light guide according to an embodiment of this application.

FIG. 1 is a schematic front view of a structure of a light guide according to an embodiment of this application, and FIG. 2 is a schematic diagram of a lateral structure of a light guide according to an embodiment of this application. Refer to FIG. 1 and FIG. 2. A light guide 100 in embodiments of this application includes a light guide plate 110 and a two-dimensional grating 120. The two-dimensional grating 120 is located on a surface of the light guide plate 110. Specifically, the two-dimensional grating 120 and the light guide plate 110 may form an integrated structure together, that is, the two-dimensional grating 120 is fabricated on the surface of the light guide plate 110. The two-dimensional grating 120 includes a plurality of grating units 121. The plurality of grating units 121 are arranged along a first direction m and a second direction n, and may be specifically arranged in a planar shape. Specifically, refer to FIG. 1. The plurality of grating units 121 are arranged at an interval of a first distance $p_m$ along the first direction m, and arranged at an interval of a second distance $P_n$ along the second direction n. In other words, the plurality of grating units 121 may be considered as a plurality of rows of grating units 121 extending along the first direction m, the plurality of rows of grating units 121 are parallel and arranged along the second direction n, and a distance between neighboring grating units 121 in each row of grating units 121 is the first distance Pm; or the plurality of grating units 121 may be considered as a plurality of rows of grating units 121 extending along the second direction n, the plurality of rows of grating units 121 are parallel and arranged along the first direction m, and a distance between neighboring grating units 121 in each row of grating units 121 is the second distance Pn. The two-dimensional grating 120 includes a light egress area 140 and a light ingress area 130 that are sequentially arranged along a third direction y. A fourth direction x is perpendicular to the third direction y. The first direction m, the second direction n, the third direction y, and the fourth direction x are located on a same plane, and any two of the directions do not overlap. Refer to FIG. 1. It may be considered that a rectangular coordinate system is established by using the third direction y, in which the light egress area 140 faces the light ingress area 130, as a Y axis, and using the fourth direction x as an X axis. The first direction m and the second direction n do not overlap with but are at a specific included angle with the rectangular coordinate system, so that grating vectors are formed as needed.

The grating unit of the two-dimensional grating may diffract one incident light beam into at least three emergent light beams. Herein, one incident light beam may be understood as one ray vector incident into the grating unit, and three emergent light beams may be understood as three ray vectors emitted out of the grating unit. When the light guide is used to perform image transmission, after a light spot of each pixel is diffracted by the grating unit, three light spots may be formed. In this technical solution, a grating unit in the light ingress area of the light guide receives a light ray, and the grating unit is configured to diffract one incident light beam into at least three emergent light beams. The light ray is expanded inside the light guide plate by the grating unit, and emitted out of a grating unit in the light egress area. In this solution, after the light ray is emitted to the grating unit, the grating unit diffracts one incident light beam into at least three emergent light beams for transmission. Specifically, one incident light beam may be diffracted into four emergent light beams, five emergent light beams, six emergent light beams, or the like. This is not limited in this application. In conclusion, there are a plurality of transmission paths for a light ray incident into the light guide; a part of a field of view may be allowed to escape from the light guide during transmission on a main path; and a compensation path is used to compensate for the field of view that escaped from the light guide, so that transmission with a relatively large field of view may be supported by using one light guide plate. To be concise, the light guide in this solution can perform transmission with a relatively large field of view, and a structure of the light guide is relatively simple.

Figure 3:
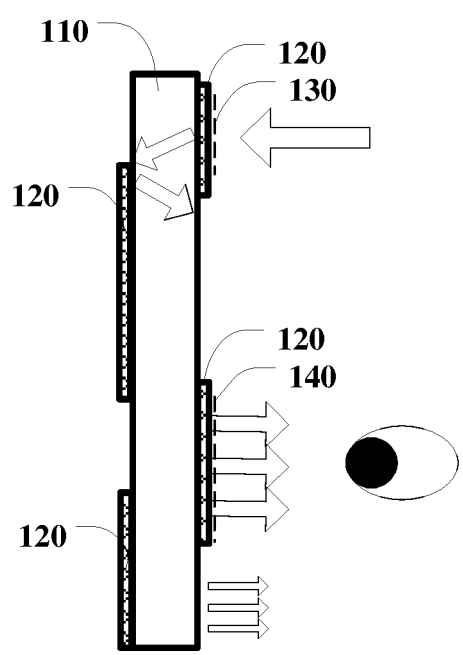
FIG. 3 is another schematic diagram of a lateral structure of a light guide according to an embodiment of this application.

In a specific embodiment, the two-dimensional grating 120 is located on the surface of the light guide plate 110, so that the two-dimensional grating 120 may be easily prepared. However, in real-word application, with reference to FIG. 2, all grating units 121 of the two-dimensional grating 120 may be located on a surface of and on a same side of the light guide plate 110. FIG. 3 is another schematic diagram of a lateral structure of a light guide according to an embodiment of this application. As shown in FIG. 3, grating units 121 in some areas of the two-dimensional grating 120 may be located on a surface of and on one side of the light guide plate 110, and a remaining part of the grating units 121 of the two-dimensional grating 120 may be located on a surface of and on another side of the light guide plate 110. This is not limited in this application. FIG. 3 is merely an example for description. In real-word application, a position of a grating unit 121 in a proper area may be selected based on a requirement. The two-dimensional grating 121 located on the surfaces of the light guide plate 110 on the two sides may partially overlap, so as to improve picture uniformity.

Refer to FIG. 1. Dashed lines extending along the first direction m and dashed lines extending along the second direction n in the figure may be considered as auxiliary lines for preparing the two-dimensional grating 120, and do not mean an actual structure. Specifically, the auxiliary lines extend along the first direction m and the second direction n respectively, and points at which the auxiliary lines intersect with each other are positions at which the grating units 121 are disposed.

A grating is usually formed by modulating a refractive index at a periodic sub-wavelength scale. For convenience, a person skilled in the art usually uses a K space, that is, a wave vector space, to understand and quantize a deflection behavior of a grating on a light ray. A diffraction grating is usually represented by using a grating vector, and may be defined as $\vec{k}_G = 2\pi/\vec{\Lambda}$, where $\vec{\Lambda}$ is a grating periodicity. A ray behavior of a light ray may be also represented by using a three-dimensional space vector. In the K space, a ray direction change caused by a grating may be described by using a vector sum as follows:

$$\vec{k}_{out} = \vec{k}_{in} + M \cdot \vec{k}_G$$

where $\vec{k}_{in}$ is a vector of a light ray incident to the grating, $\vec{k}_{out}$ not is a vector of the light ray after the light ray is deflected by the grating, $\vec{k}_G$ is a grating vector, M is a diffraction order of the grating vector deflecting the light ray, M is an integer, and M may be specifically a positive number, a negative number, or zero.

Figure 4:
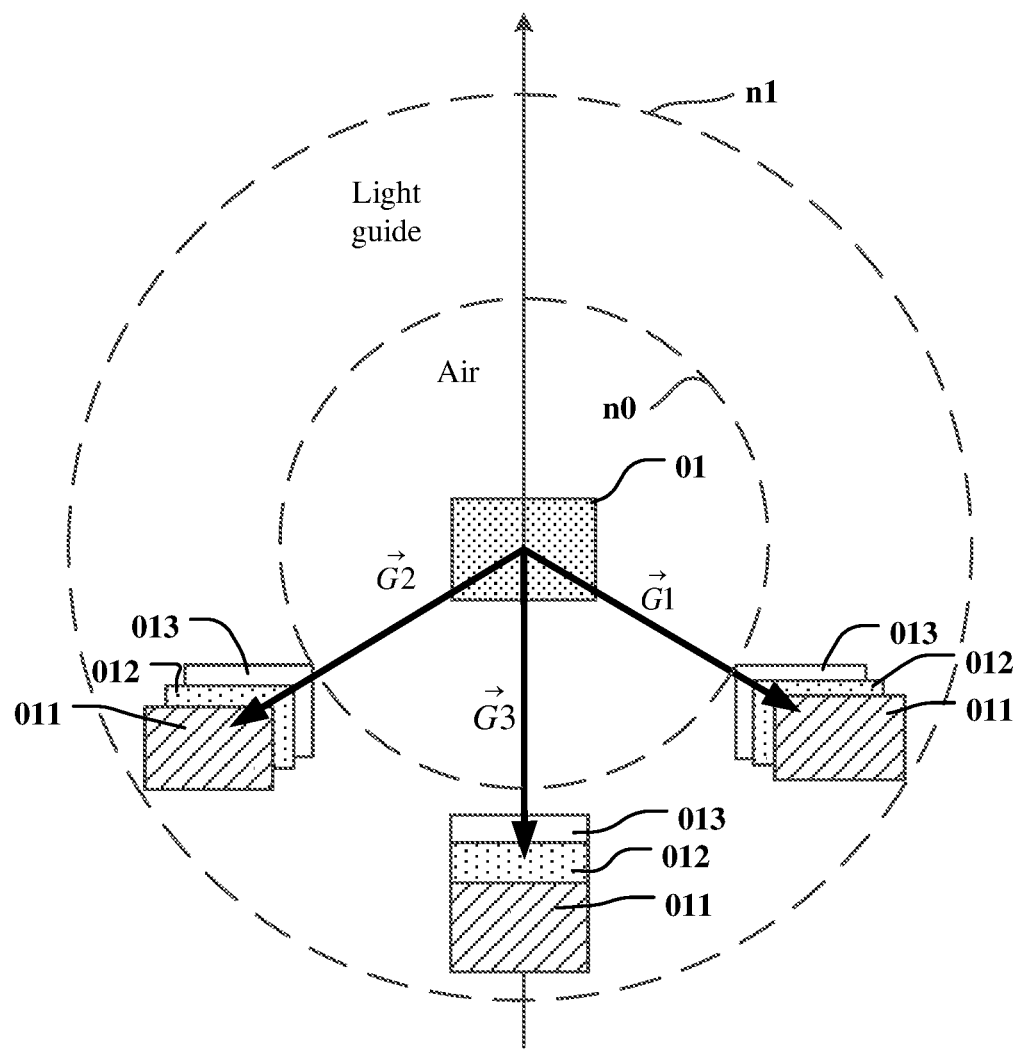
FIG. 4 is a schematic diagram of a structure of a wave vector space of a light guide according to a conventional technology.

In other words, a propagation trail of a light ray in a light guide plate 110 that has a grating may be observed by using the K space. FIG. 4 is a schematic diagram of a structure of a wave vector space of a light guide according to a conventional technology. Refer to FIG. 4. For a light guide 100, transmission of a light ray in a light guide plate 110 can be performed only when the light ray enters a ring that is formed by an inner dashed circle and an outer dashed circle in the K space. A radius of the inner dashed circle is $n_0$, where $n_0$ is a refractive index of air; and a radius of the outer dashed circle is equal to $n_1$, where $n_1$ is a refractive index of the light guide 100. A light ray can be propagated in the light guide 100 only when a wave vector of the light ray falls into the ring between the inner dashed circle and the outer dashed circle; and then may be probably emitted from a light egress area 140 to an eye box area. Therefore, in a case of the conventional technology shown in FIG. 4, to propagate, by using the light guide 100, a picture 01 having a field 011 of view of red light, a field 013 of view of blue light, and a field 012 of view of green light, because wavelengths of light rays with the three colors are different, to ensure integrity of a field of view, that is, the entire field of view can fall into the ring, a specific field of view needs to be sacrificed. Consequently, a field of view of the picture 01 transmitted in the light guide 100 is relatively small.

Figure 5:
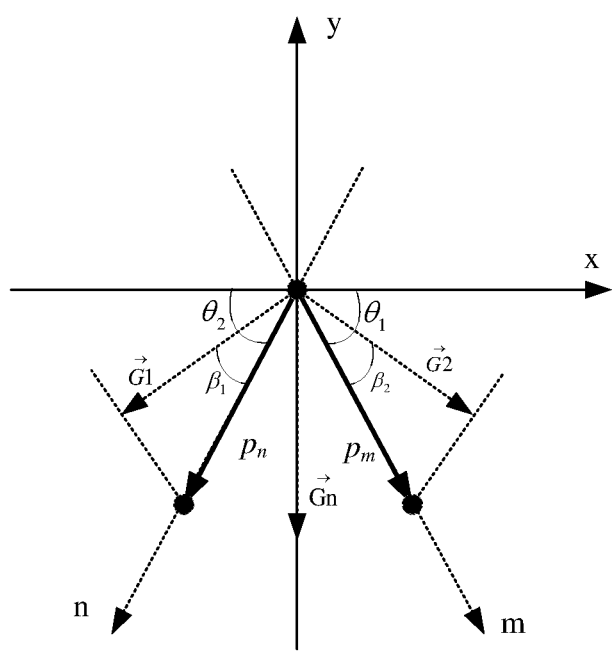
FIG. 5 is a schematic diagram of local distribution of a grating unit according to an embodiment of this application.

FIG. 5 is a schematic diagram of local distribution of a grating unit according to an embodiment of this application. As shown in FIG. 5, the grating unit 121 includes a first grating vector $\vec{G1}$, a second grating vector $\vec{G2}$, and a combined grating vector $\vec{Gn}$. The first grating vector $\vec{G1}$ is perpendicular to the first direction m, and may tilt toward the light egress area 140. The second grating vector $\vec{G2}$ is perpendicular to the second direction n, and may also tilt toward the light egress area 140. The first grating vector $\vec{G1}$ and the second grating vector $\vec{G2}$ are basic grating vectors of the grating unit 121. All combined grating vectors $\vec{Gn}$ are obtained based on the first grating vector $\vec{G1}$ and the second grating vector $\vec{G2}$. Specifically, the combined grating vector $\vec{Gn}$ is a vector sum of the first grating vector $\vec{G1}$ at a diffraction order M1 and the second grating vector $\vec{G2}$ at a diffraction order M2, where M1 and M2 are integers. Refer to FIG. 4. An included acute angle between the first direction m and the fourth direction x is $\theta_1$, an included acute angle between the second direction n and the fourth direction x is $\theta_2$, an included angle between the first grating vector $\vec{G1}$ and the second direction n is $\beta_1$, and an included angle between the second grating vector $\vec{G2}$ and the first direction m is $\beta_2$. In this case, formulas of the first grating vector $\vec{G1}$, the second grating vector $\vec{G2}$, and the combined grating vector $\vec{Gn}$ may be as follows for reference:

$$\vec{G1} = \frac{2 \times \pi}{p_n \times \cos\beta_1}$$

$$\vec{G2} = \frac{2 \times \pi}{p_m \times \cos\beta_2}$$

$$\vec{Gn} = M_1 \times \vec{G1} + M_2 \times \vec{G2}$$

When a light ray is emitted to the two-dimensional grating 120, diffraction occurs under the effect of the first grating vector $\vec{G1}$, the second grating vector $\vec{G2}$, and the combined grating vector $\vec{Gn}$. Specifically, in embodiments of this application, it may be considered that the light guide 100 further includes a light expansion area between the light ingress area 130 and the light egress area 140. It is worth noting that the foregoing areas may be determined based on an actual status of application, and are not necessarily fixed areas in the light guide 100. In other words, an area from which the picture 01 enters the light guide 100 is the light ingress area 130, an area from which the picture 01 is emitted out of the light guide 100 is the light egress area 140, and a middle area is the light expansion area. The light ingress area 130 receives a light ray, and the light ray enters the light guide plate 110 from a grating unit 121 in the light ingress area 130 of the light guide 100; total reflection occurs on a surface of the light guide plate 110 on a side away from the two-dimensional grating 120; and light is expanded on a side that is of the light guide plate 110 and that faces the grating units 121 of the two-dimensional grating 120, and is led out of a grating unit 121 in the light egress area 140 after experiencing a plurality of times of reflection. In this way, the picture 01 that enters the light guide 100 from the light ingress area 130 may be enlarged and then led out of the light egress area 140, so that a user can watch the picture 01. Specifically, each time a light ray is emitted to a grating unit 121, the light ray is divided into several parts, which are respectively enabled by the first grating vector $\vec{G1}$, the second grating vector $\vec{G2}$, and the combined grating vector $\vec{Gn}$ of the grating unit 121 for transmission. In other words, a light ray is coupled, at a grating unit 121 in the light ingress area 130, into the light guide plate 110 under the enabling effect of the first grating vector $\vec{G1}$, the second grating vector $\vec{G2}$, and the combined grating vector $\vec{Gn}$; total reflection occurs on a surface t of the light guide plate 110 on a side opposite to the light ingress area 130 and the light expansion area; then, light is emitted to a grating unit 121 in the light ingress area 130 and a grating unit 121 in the light expansion area; then, under the enabling effect of the first grating vector $\vec{G1}$, the second grating vector $\vec{G2}$, and/or the combined grating vector $\vec{Gn}$ of the grating unit 121, the light is emitted back into the light guide plate 110; this goes on until the light is emitted to a grating unit 121 in the light egress area 140; and then, under the enabling effect of the first grating vector $\vec{G1}$, the second grating vector $\vec{G2}$, and the combined grating vector Gn, the light is emitted out of the light guide plate 110. To ensure that the light ray can be emitted out of the light guide 100 from the light egress area 140, a vector sum of grating vectors that influence each part of the light ray during the transmission needs to be zero.

Refer to FIG. 5 again. The first direction m, the second direction n, the third direction y, and the fourth direction x are located on a same plane, and any two of the directions do not overlap. In other words, there is an included acute angle whose absolute value is not equal to 0° or not equal to 90° between the first direction m and the x axis; and between the second direction n and the y axis. In this case, the angle may be any angle between (0°, 90°). As shown in FIG. 5, the first direction m and the second direction n respectively tilt toward two sides of the fourth direction x, the included acute angle between the first direction m and the fourth direction x is $\theta_1$, and the included acute angle between the second direction n and the fourth direction x is $\theta_2$. Specifically, the included acute angle $\theta_1$ between the first direction m and the fourth direction x meets: $10 \leq \theta_1 \leq 80$. Specifically, a value of $\theta_1$ may be 20°, 25.5°, 28°, 30°, 40°, 45°, 48°, 50°, 55°, 59°, 60°, 64°, 65°, 70°, 75°, or the like. This is not limited in this application. Similarly, the included acute angle $\theta_2$ between the second direction n and the fourth direction x meets: $10 \leq \theta_2 \leq 80$. Specifically, a value of $\theta_2$ may be 18°, 20°, 25°, 28°, 30°, 35°, 40°, 45°, 48°, 50°, 55°, 59°, 60°, 64°, 65°, 70°, 75°, or the like. This is not limited in this application.

In a specific technical solution, the first direction m and the second direction n may be symmetric relative to the third direction y, or the first direction m and the second direction n may be axisymmetric based on an orthogonal coordinate system. In other words, the included acute angle $\theta_1$ between the first direction m and the fourth direction x, and the included acute angle $\theta_2$ between the second direction n and the fourth direction x meet: $\theta_1 = \theta_2$. In another embodiment, the first direction m and the second direction n may be alternatively non-axisymmetric relative to an orthogonal coordinate system, provided that the first direction m and the second direction n intersect with each other and respectively tilt toward two sides of the third direction y. This is not limited in this application. However, in embodiments of this application, description is provided merely by using an example in which the first direction m and the second direction n are axisymmetric based on an orthogonal coordinate system.

Different grating vectors of the light guide 100 act on light rays with different wavelengths. The following enumerates a specific embodiment. In this embodiment, the light guide 100 performs transmission of a picture 01 including red light, green light, and blue light. The technical solutions of this application are described by using a light ray whose incident angle is 0 degrees as an example.

Figure 6:
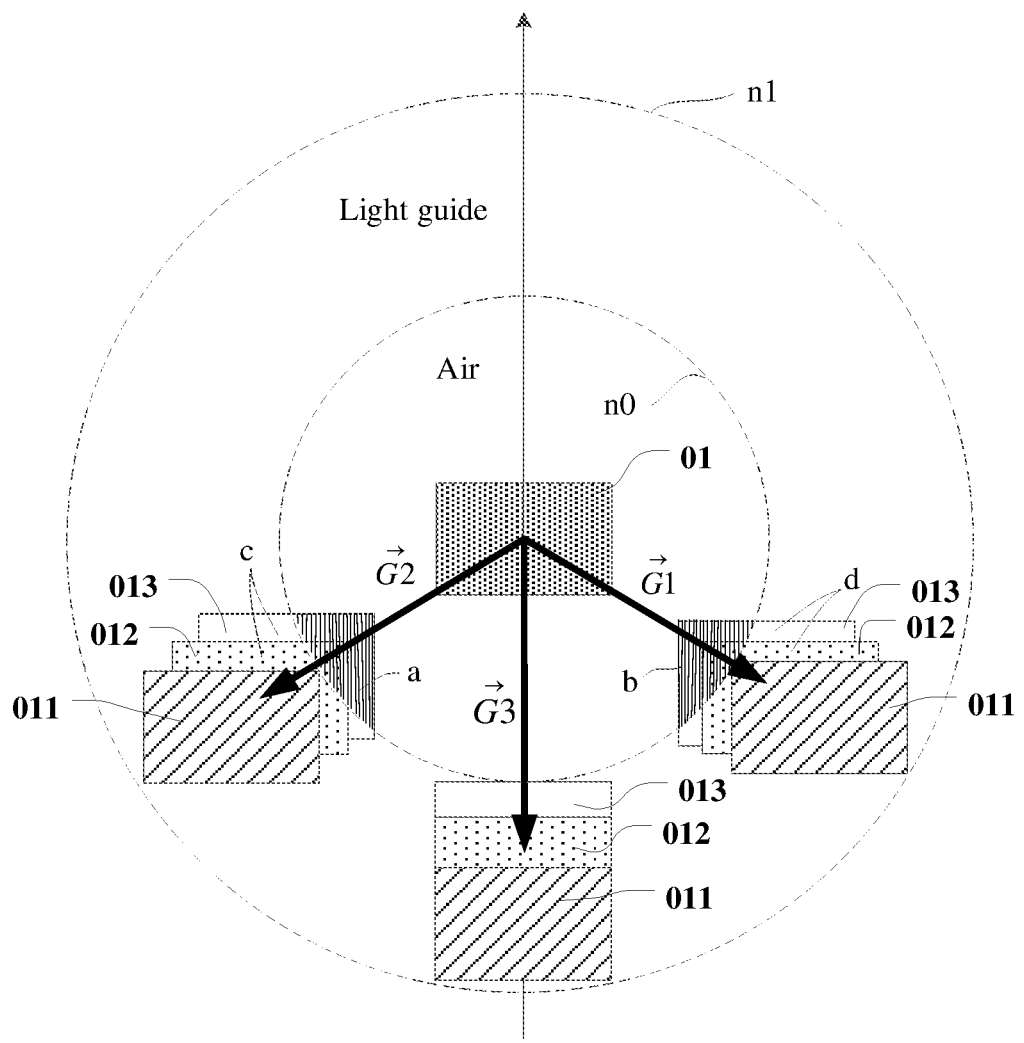
FIG. 6 is a schematic diagram of a structure of picture transmission in a light guide according to an embodiment of this application.

FIG. 6 is a schematic diagram of a structure of picture transmission in a light guide according to an embodiment of this application. As shown in FIG. 6, the grating unit 121 includes a first grating vector $\vec{G1}$, a second grating vector $\vec{G2}$, and a first combined grating vector $\vec{G3}$, that is, when M1=M2=1, the first combined grating vector $\vec{G3}$ may be obtained, that is, $\vec{G3} = \vec{G1} + \vec{G2}$. As shown in FIG. 6, under the effect of the first grating vector $\vec{G1}$, the second grating vector $\vec{G2}$, and the first combined grating vector $\vec{G3}$ of the grating unit 121, all red light in a picture 01 may be coupled into the light guide 100; and after being expanded, the red light is led out of the light guide 100 from the light egress area 140, so as to ensure that a field 011 of view of the red light is not lost. However, while it is ensured that the field 011 of view of the red light is not lost and the field 011 of view of the red light is the maximum, a field 013 of view of blue light and a field 012 of view of green light, for example, an area a and an area b in the figure, are lost.

Figure 7:
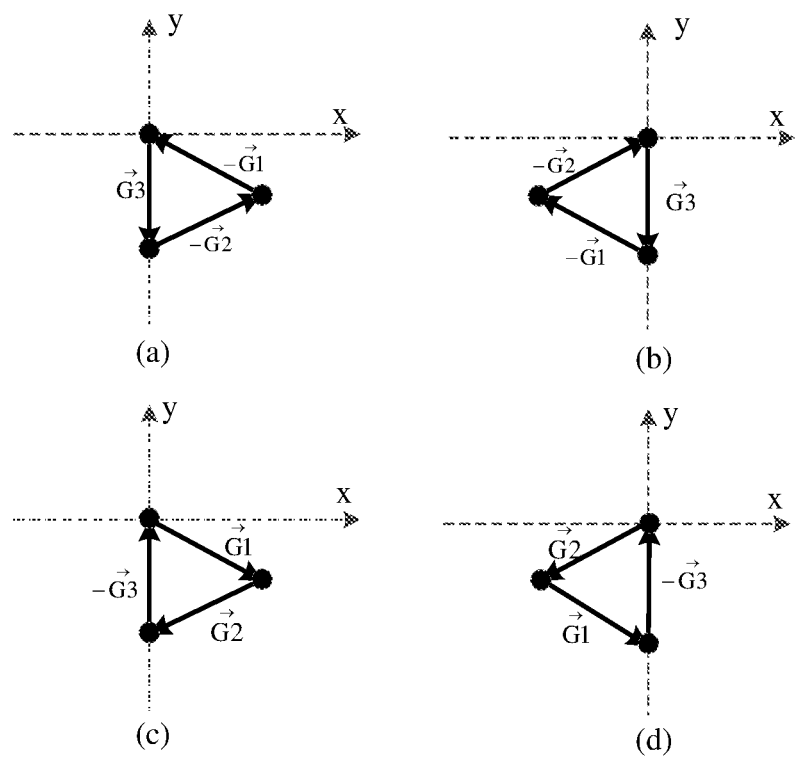
FIG. 7 is a schematic diagram of a transmission path of red light of a picture in a light guide according to an embodiment of this application.

FIG. 7 is a schematic diagram of a transmission path of red light of a picture in a light guide according to an embodiment of this application. As shown in FIG. 7, a transmission path of the red light includes a first grating vector $\vec{G1}$, a second grating vector $\vec{G2}$, and a first combined grating vector $\vec{G3}$. In the figure, a start point of each grating vector corresponds to one grating unit 121. A transmission path shown in (a) in FIG. 7 is $\vec{G3}$, $-\vec{G2}$, and $-\vec{G1}$ in sequence, where $\vec{G3}-\vec{G2}-\vec{G1}=0$. It is worth noting that, $-\vec{G1}$ may refer to a vector that has a same size as the first grating vector $\vec{G1}$ but is in a reverse direction, and $-\vec{G2}$ may refer to a vector that has a same size as the second grating vector $\vec{G2}$ but is in a reverse direction; or they may be understood as the first grating vector $\vec{G1}$ whose diffraction order M1 is −1 and the second grating vector $\vec{G2}$ whose diffraction order M1 is −2. In other words, the transmission path shown in (a) in FIG. 7 may be understood as follows: the red light encounters a first grating unit 121; under the enabling influence of the first combined grating vector $\vec{G3}$, the red light is emitted to a second grating unit 121; and at the second grating unit 121, under the enabling influence of the second grating vector $\vec{G2}$ in a reverse direction, the red light is emitted to a third grating unit 121; and at the third grating unit 121, under the enabling influence of the first grating vector $\vec{G1}$ in a reverse direction, the red light is emitted out of the light guide 100. In this way, the red light in the picture 01 may be emitted out of the light guide 100. A transmission path shown in (b) in FIG. 7 is $\vec{G3}$, $-\vec{G1}$, and $-\vec{G2}$ in sequence, where $\vec{G3}-\vec{G1}-\vec{G2}=0$, so that the red light in the picture 01 may be emitted out of the light guide 100. A transmission path shown in (c) in FIG. 7 is $\vec{G1}$, $\vec{G2}$, and $-\vec{G3}$ in sequence, where $\vec{G1}+\vec{G2}-\vec{G3}=0$, so that the red light in the picture 01 may be emitted out of the light guide 100. A transmission path shown in (d) in FIG. 7 is $\vec{G2}$, $\vec{G1}$, and $-\vec{G3}$ in sequence, where $\vec{G2}+\vec{G1}-\vec{G3}=0$, so that the red light in the picture 01 may be emitted out of the light guide 100.

Figure 8:
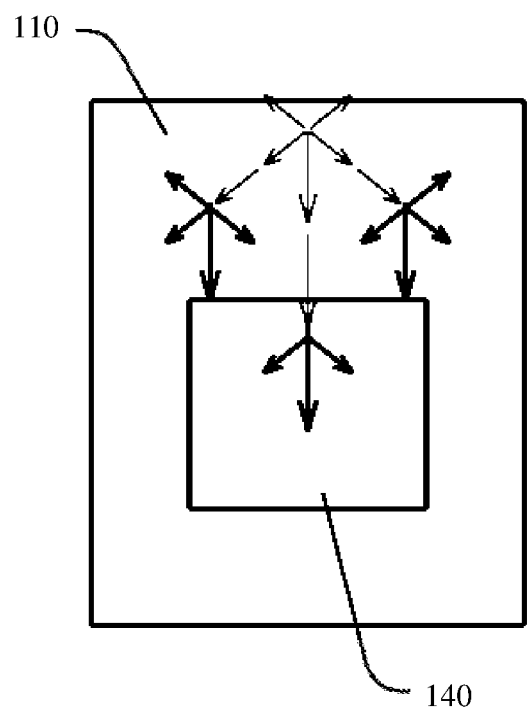
FIG. 8 is a schematic diagram of a propagation path of red light whose incident angle is zero degrees in a light guide according to an embodiment of this application.

FIG. 8 is a schematic diagram of a propagation path of red light whose incident angle is zero degrees in a light guide according to an embodiment of this application. With reference to FIG. 6 to FIG. 8, in a specific embodiment, when a beam of red light is emitted to a first grating unit 121 in the light ingress area 130 of the light guide 100 at an incident angle of zero degrees: under the enabling influence of the first grating vector $\vec{G1}$, the second grating vector $\vec{G2}$, and the first combined grating vector $\vec{G3}$, the beam of red light may be divided into several parts and coupled into the light guide plate 110; then each part of light rays respectively encounters a second grating unit 121 in the light expansion area, and is emitted to a third grating unit 121 under the enabling effect of a needed grating vector of the second grating unit 121; and then each part of light rays is emitted, under the enabling effect of a needed grating vector of the third grating unit 121, out of the light guide 100 from the light egress area 140. A vector sum of the grating vectors that are of the three grating units 121 and that have the enabling influence on each part of light ray is zero, so that the red light can be expanded in the light guide 100 and emitted out of the light guide 100.

In the foregoing technical solution, transmission of red light with a field of view FOV of at least 60° can be performed by using merely three grating vectors of one light guide 100, and a relatively large field of view can be obtained.

Refer to FIG. 7 again. Light rays having various colors in the picture 01 need to be subject to the enabling effect of the first grating vector $\vec{G1}$, the second grating vector $\vec{G2}$, and the first combined grating vector $\vec{G3}$, and the three grating vectors may form four transmission paths in FIG. 7. Because light rays having various colors need to take the foregoing four transmission paths for transmission in the light guide 100, the four transmission paths of the two-dimensional grating 120 are referred to as main paths. However, with reference to FIG. 6, a picture 01 includes a field 011 of view of red light, a field 012 of view of green light, and a field 013 of view of blue light. Because wavelengths of the red light, the green light, and the blue light are different, when the four main paths are used to perform transmission of the complete field 011 of view of red light and the field 011 of view FOV of red light is ensured to reach the maximum, a problem of a loss of a field of view may exist for the field 012 of view of green light and the field 013 of view of blue light. For example, as shown in FIG. 6, an area a and an area b in both the field 012 of view of green light and the field 013 of view of blue light are fields of view that are lost during transmission performed by using the four main paths. To compensate for the lost fields of view, transmission paths of the two-dimensional grating 120 in the technical solutions of this application further include a compensation path. Specifically, the compensation path may further include another combined grating vector $\vec{Gn}$, in addition to the first grating vector $\vec{G1}$, the second grating vector $\vec{G2}$, and the first combined grating vector $\vec{G3}$. The following describes the compensation path by enumerating specific embodiments of transmission of blue light in the picture 01.

Figure 9:
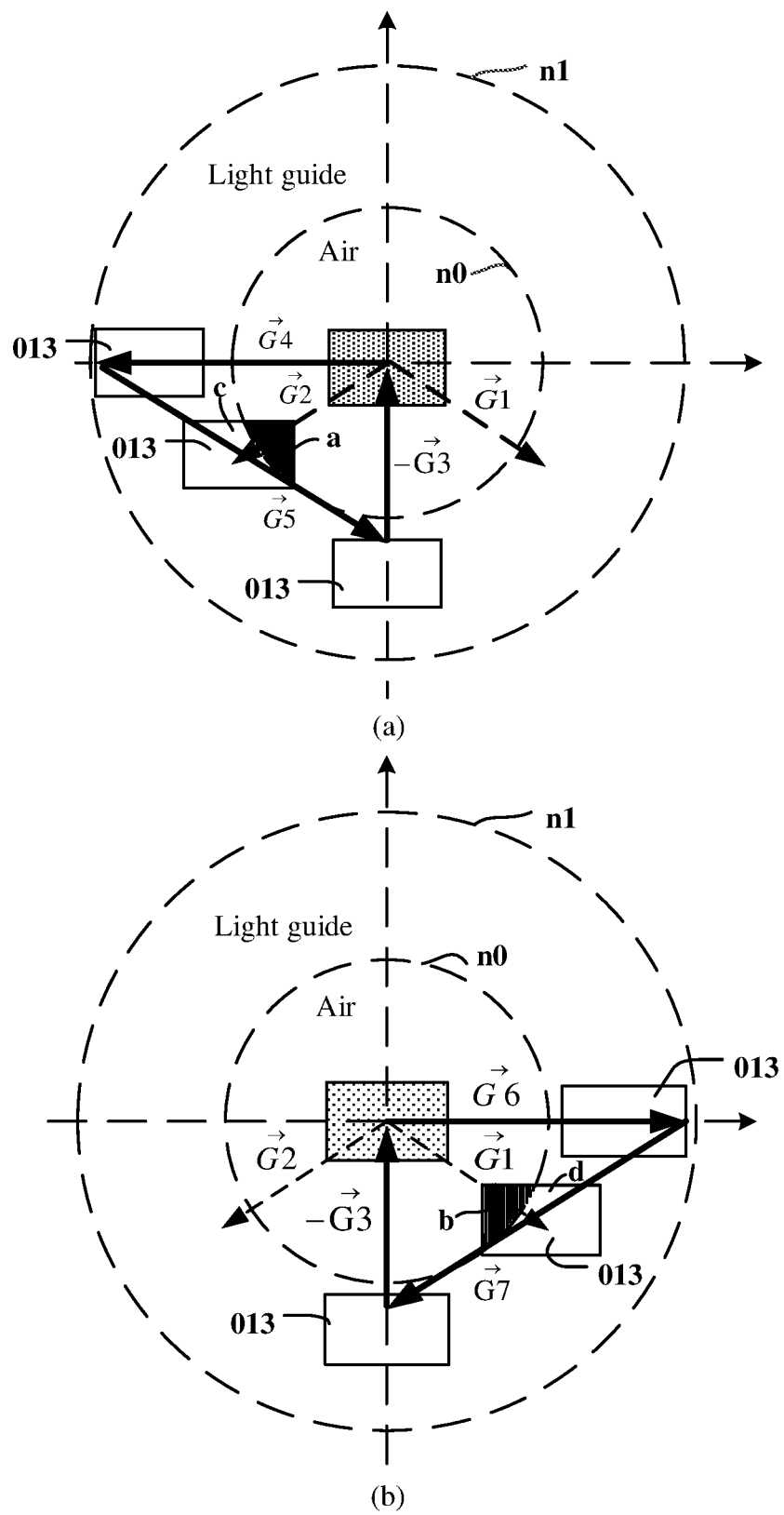
FIG. 9 is a schematic diagram of a compensation path for a field of view of blue light in a picture transmitted according to an embodiment of this application.

FIG. 9 is a schematic diagram of a compensation path for a field of view of blue light in a picture transmitted according to an embodiment of this application. With reference to FIG. 6 and FIG. 9, when the light guide 100 in embodiments of this application is used for transmission of the field 013 of view of blue light in the picture 01, the foregoing main paths may be used for the transmission, to perform transmission of an area c in the field of view of blue light and an area d in the field of view of blue light in FIG. 6. For a specific transmission path, refer to FIG. 7. For the field of view of blue light, a compensation path may be further used to compensate for the missing area a in the field of view of blue light and the missing area b in the field of view of blue light. Specifically, to form the compensation path, the combined grating vector $\vec{Gn}$ of the grating unit 121 may further include a second combined grating vector $\vec{G4}$, a third combined grating vector $\vec{G5}$, a fourth combined grating vector $\vec{G6}$, and a fifth combined grating vector $\vec{G7}$.

For example, in a specific embodiment, a first compensation path shown in (a) in FIG. 9 may be used to compensate for the missing area a in the field of view of blue light.

Specifically, grating vectors corresponding to the first compensation path are $\vec{G4}$, $\vec{G5}$, and $-\vec{G3}$ in sequence. In a specific embodiment, the second combined grating vector may be considered as: $\vec{G4}=\vec{G2}-\vec{G1}$, that is, M1=−1, and M2=1. Certainly, in another embodiment, M1 may be a negative value and M2 may be a positive value, to obtain the second combined grating vector $\vec{G4}$. The third combined grating vector is $\vec{G5}=2\times\vec{G1}$, that is, M1=2 and M2=0. Certainly, in another embodiment, M1 may be a positive value and M2 may be zero, to obtain the third combined grating vector $\vec{G5}\cdot\vec{G4}+\vec{G5}-\vec{G3}=0$. In this way, the first compensation path may be used to compensate for the missing area a in the field of view of blue light. Similarly, a second compensation path shown in (b) in FIG. 9 may be used to compensate for the missing area b in the field of view of blue light. Specifically, the second compensation path is $\vec{G6}$, $\vec{G7}$, and $-\vec{G3}$ in sequence. In a specific embodiment, the fourth combined grating vector may be considered as: $\vec{G6}=\vec{G1}-\vec{G2}$, that is, M1=1 and M2=−1. Certainly, in another embodiment, M1 may be a positive value and M2 may be a negative value, to obtain the fourth combined grating vector $\vec{G6}$. The fifth combined grating vector is $\vec{G7}=2\times\vec{G2}$, that is, M1=0 and M2=2. Certainly, in another embodiment, M2 may be a positive value and M1 may be zero, to obtain the fifth combined grating vector $\vec{G7}\cdot\vec{G6}+\vec{G7}-\vec{G3}=0$. In this way, the second compensation path may be used to compensate for the missing area b in the field of view of blue light. Using the main path and the compensation paths can ensure that a complete field view of blue light is emitted out of the light egress area 140, thereby ensuring integrity of the field view of blue light.

Figure 10:
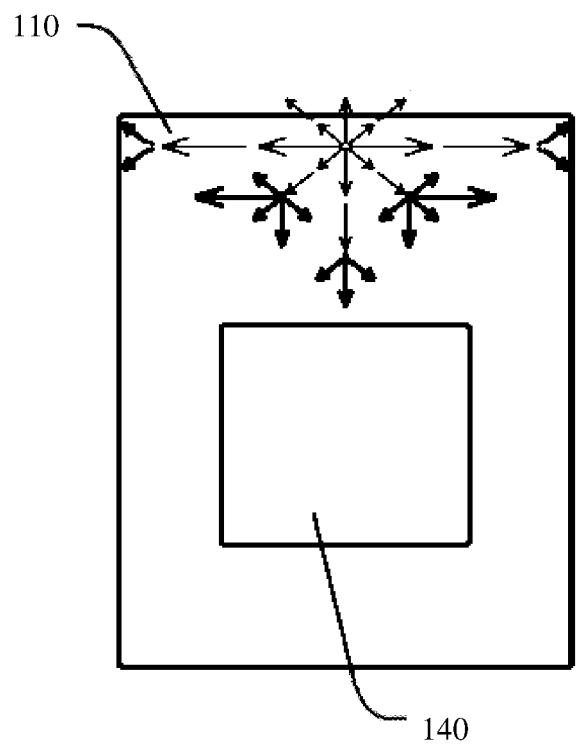
FIG. 10 is a schematic diagram of a propagation path of blue light whose incident angle is zero degrees in a light guide according to an embodiment of this application.

FIG. 10 is a schematic diagram of a propagation path of blue light whose incident angle is zero degrees in a light guide according to an embodiment of this application. With reference to FIG. 9 and FIG. 10, in a specific embodiment, when a beam of blue light is emitted to a first grating unit 121 in the light ingress area 130 of the light guide 100 at an incident angle of zero degrees: under the enabling effect of the first grating vector $\vec{G1}$, the second grating vector $\vec{G2}$, the first combined grating vector $\vec{G3}$, the second combined grating vector $\vec{G4}$, and the fourth combined grating vector $\vec{G6}$, the beam of blue light may be divided into several parts and coupled into the light guide plate 110; then each part of light rays respectively encounters a second grating unit 121 in the light expansion area, and is emitted to a third grating unit 121 under the effect of a needed grating vector of the second grating unit 121; and then each part of light rays is emitted, under the effect of a needed grating vector of the third grating unit 121, out of the light guide 100 from the light egress area 140. A vector sum of the grating vectors of the three grating units 121 that each part of light rays passes through is zero, so that the blue light can be expanded in the light guide 100 and emitted out of the light guide 100. In conclusion, in this application, the blue light may be propagated by using a compensation path in addition to a main path.

For the field of view of green light in the picture 01, the light guide 100 may perform transmission also by using a main path and a compensation path. The compensation path for the field of view of green light may be the same as or different from the compensation path for the field view of blue light. This is not limited in this application.

It is worth noting that, in the foregoing embodiment, complete transmission of the field 011 of view of red light can be implemented by using merely a main path. In another example, a grating vector may be properly designed, so that transmission of the field 011 of view of red light may be performed also by using a main path in combination with a compensation path.

In this solution, the light guide 100 has a two-dimensional grating 120, and a basic grating vector may be formed in two directions each; with reference to a combined grating vector $\vec{Gn}$ that is formed by using the two basic grating vectors, grating vectors with quite many sizes may be formed in quite many directions; the quite many grating vectors may form a main path and a compensation path; and transmission of a light ray with a relatively large field of view may be performed by using the main path and the compensation path. In this solution, transmission of light rays, which have various colors, of the picture 01 may be implemented by using one light guide 100, and a relatively large field of view can be ensured. Therefore, in this solution, in a case in which the field of view is increased, additionally the structure of the light guide 100 can be simplified, to reduce a cost and help implement miniaturization of a near-eye display apparatus in which the light guide 100 is used.

It is worth noting that, in the foregoing embodiment, specific directions and sizes of the first grating vector $\vec{G1}$, the second grating vector $\vec{G2}$, and each combined grating vector $\vec{Gn}$, and specific values of M1 and M2 are all used as examples to describe, from the prospective of principles, working processes of grating vectors of the light guide 100 having the two-dimensional grating 120 in embodiments of this application; and are not intended to serve as a single specific solution. A person skilled in the art may choose to design, under the guidance of the specification of this application, specific directions and sizes of the first grating vector $\vec{G1}$, the second grating vector $\vec{G2}$, and each combined grating vector $\vec{Gn}$, and specific values of M1 and M2 based on an actual situation. Specifically, the specific directions and sizes of the first grating vector $\vec{G1}$ and the second grating vector $\vec{G2}$ are determined by a grating periodicity arrangement scheme of the two-dimensional grating 120; and the specific directions and sizes of the combined grating vectors $\vec{Gn}$ may be designed based on the first grating vector $\vec{G1}$ and the second grating vector $\vec{G2}$ by designing the structure of the grating unit 121, for example, designing the diffraction order M1 and the diffraction order M2.

It needs to be understood that, the foregoing embodiments are described only from the perspective of an incident ray whose incident angle is 0°. In real-word application, the incident angle includes angles of light rays of the entire picture 01, and details are not described herein again. When the incident angle of the light ray is another angle not equal to 0, the light ray needs to be transmitted from a grating vector that corresponds to a sum of the first grating vector and an initial vector of a target light ray, a grating vector $\vec{G1}$ that corresponds to a sum of the second grating vector $\vec{G2}$ and the initial vector of the target light ray, and a grating vector that corresponds to a sum of the combined grating vector $\vec{Gn}$ and the initial vector of the target light ray. For example, if an initial vector of the light ray is $\vec{k}$, the target light ray needs to be transmitted from grating vectors corresponding to $\vec{G1}+\vec{k}$, $\vec{G2}+\vec{k}$, and $\vec{Gn}+\vec{k}$. In conclusion, transmission is performed under the enabling effect of a corresponding grating vector. Details are not described herein again.

In the technical solutions of this application, a part of a field of view may be allowed to escape from the light guide 100, and a compensation path may be used to compensate for the field of view that escaped from the light guide 100. During specific designing of the two-dimensional grating 120 in the technical solutions of this application, high diffraction orders may be chosen as the foregoing diffraction orders. Specifically, the diffraction order M1 may be −3, −2, −1, 0, 1, 2, or 3; and the diffraction order M2 includes −3, −2, −1, 0, 1, 2, and 3. The diffraction orders may be even higher. For example, the diffraction order M1 may be −5, −4, 4, 5, or the like; and the diffraction order M2 includes −5, −4, 4, 5, and the like. Therefore, a relatively large quantity of combined grating vectors $\vec{Gn}$ may be obtained by making full use of the high diffraction orders, to obtain a compensation path that meets a compensation requirement. It is worth noting that the diffraction order herein refers to a diffraction order in a wave vector space.

Since there is a compensation path, it is not required that, during transmission of the picture 01 on a main path, all fields of view of all colors in the picture 01 already exist in the light guide 100. In other words, when transmission of the picture 01 is performed by using the main path, some light rays in a field of view are allowed to escape from the light guide 100, and then a compensation path is used to compensate for the light rays that escaped from the light guide 100. In this way, a relatively large picture 01 can be transmitted. Specifically, the light guide 100 in the technical solutions of this application may perform transmission of the picture 01 with a field of view of at least 60°. Compared with a conventional technology, the light guide 100 including merely one light guide plate 110 can perform transmission of a picture 01 with a relatively large field of view. The field of view is expanded while the structure of the light guide 100 is simplified.

Refer to FIG. 1. All grating units 121 of the two-dimensional grating 120 may have a same form, so that the two-dimensional grating 120 may be easily fabricated and prepared. It is worth noting that, forms of the grating units 121 in the accompanying drawings of embodiments of this application are represented by using simple shapes such as circles and polygons. The shapes are used to indicate that shapes and sizes of the grating units 121 are different, but do not represent actual shapes and sizes of the grating units 121. For example, shapes of the grating units 121 in FIG. 1 are all circles, which only indicate that the shapes of the grating units 121 are the same, but do not indicate that the actual shapes of the grating units 121 are circles.

Figure 11:
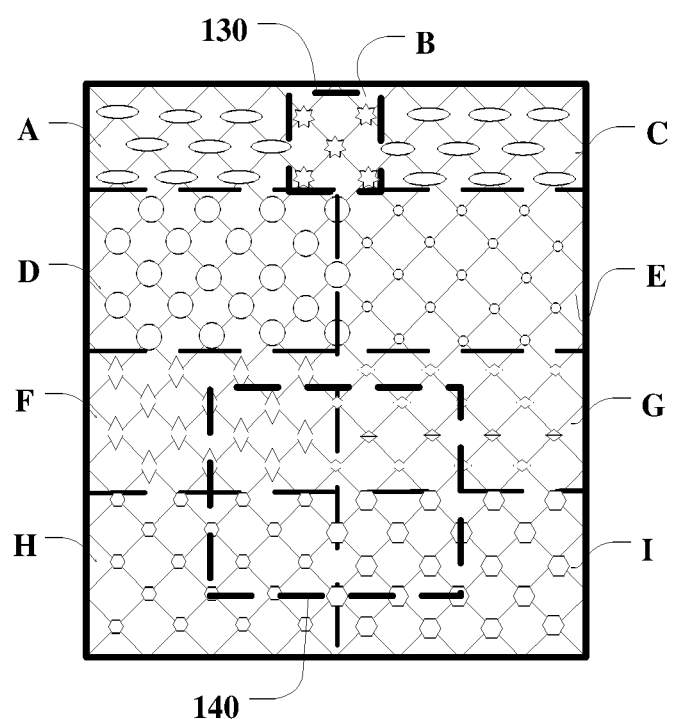
FIG. 11 is another schematic diagram of a structure of a two-dimensional grating according to an embodiment of this application.

FIG. 11 is another schematic diagram of a structure of a two-dimensional grating according to an embodiment of this application. Refer to FIG. 11. The two-dimensional grating 120 includes at least two sub-areas, and grating units 121 in neighboring sub-areas have different forms, but grating units 121 in a same sub-area have a same form. The sub-areas in this embodiment are divided based on different forms of the grating units 121 in the sub-areas. For example, in the embodiment shown in FIG. 11, the two-dimensional grating 120 unit includes nine sub-areas, which are respectively represented by A to I. Grating units 121 in the sub-area A and the sub-area C are elliptical. Although the forms of the grating units 121 in the sub-area A and the sub-area C are the same, the two sub-areas are not adjacent to each other, and a form of a grating unit 121 in the two sub-areas each is different from a form of a grating unit 121 in a sub-area that is adjacent to the two sub-areas each. A diffraction order corresponding to a basic grating vector of each grating unit 121 may be designed by designing a specific form of the grating unit 121, so as to design a proper main path and a proper compensation path.

It is worth noting that a specific form of the grating unit 121 in embodiments of this application is not limited, and may be specifically a grating form, such as a blazed, inclined, rhombic, binary, or pillar form.

Figure 12:
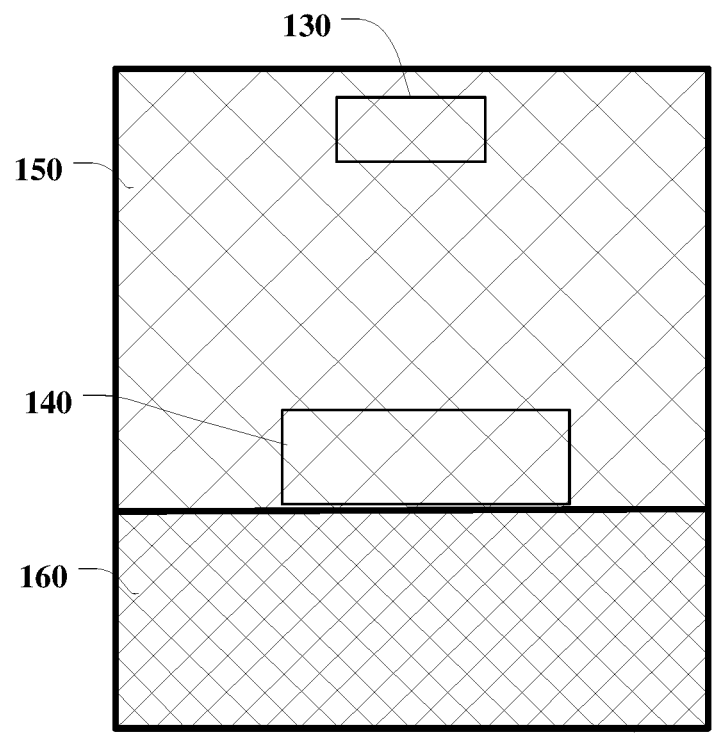
FIG. 12 is another schematic diagram of a structure of a two-dimensional grating according to an embodiment of this application.

FIG. 12 is another schematic diagram of a structure of a two-dimensional grating according to an embodiment of this application. Refer to FIG. 12. The two-dimensional grating 120 may further include at least two sub-areas, the first distances Pm of neighboring sub-areas are different, and the second distances Pn of the neighboring sub-areas are different. In this embodiment, the sub-areas are divided based on different distances between the grating units 121 in the sub-areas. In this solution, a plurality of possibilities of the first grating vector $\vec{G1}$ and the second grating vector $\vec{G2}$ may be provided, so that more possible combined grating vectors may be formed, to form a plurality of grating path combinations, thereby enabling more light rays to be emitted out of the light egress area 140 to increase a field of view.

Refer to FIG. 12 again. Specifically, the two-dimensional grating 120 may include two sub-areas: a first sub-area 150 and a second sub-area 160, where the second sub-area 160 and the first sub-area 150 are sequentially arranged along the third direction y. The light ingress area 130 and the light egress area 140 are located in the first sub-area 150, the second sub-area 160 is located on a side that is of the light egress area 140 and that is away from the light ingress area 130, the first distance Pm of the first sub-area 150 is greater than the first distance Pm of the second sub-area 160, and the second distance Pn of the first sub-area 150 is greater than the second distance Pn of the second sub-area 160. In other words, a grating periodicity of the second sub-area 160 is less than a grating periodicity of the first sub-area 150. This solution can reduce an energy loss of a light ray in the light guide 100, and improve light ray transmission efficiency of the light guide 100.

With reference to FIG. 2, after a light ray enters the light guide 100 from the light ingress area 130, the light ray is transmitted and expanded in the light guide 100, and then emitted out of the light egress area 140. However, there is still some missing light on a side that is of the light egress area 140 and that is away from the light ingress area 130. In other words, there is still some missing light in the second sub-area 160. The missing light refers to light that cannot enter the human eye. In the embodiment shown in FIG. 12, a grating periodicity of the grating units 121 in the second sub-area 160 is relatively small, and a formed grating vector may return a light ray transmitted to the second sub-area 160 to the first sub-area 150, for example, a grating unit 121 between the light ingress area 130 and the light egress area 140; and then the light ray is transmitted again by using a grating unit 121, and is emitted out of the light egress area 140. This can reduce an energy loss of a light ray in the light guide 100 and improve light ray transmission efficiency of the light guide 100.

In a specific embodiment, the first distance Pm of the first sub-area 150 is T times the first distance Pm of the second sub-area 160, and the second distance Pn of the first sub-area 150 is T times the second distance Pn of the second sub-area 160, where T is a positive integer which is at least 2. In addition, the first distances Pm between the grating units 121 in the first sub-area 150 may be equal or unequal; and the second distances Pn between the grating units 121 in the first sub-area 150 may be equal or unequal. Similarly, the first distances Pm between the grating units 121 in the second sub-area 160 may be equal or unequal; and the second distances Pn between the grating units 121 in the second sub-area 160 may be equal or unequal. In other words, the first sub-area 150 may be divided into sub-areas, and the second sub-area 160 may also be divided into sub-areas. This is not limited in this application.

Certainly, in another embodiment, in the embodiment shown in FIG. 1, the first distances Pm of the two-dimensional grating 120 are equal to each other, and the second distances Pn of the two-dimensional grating 120 are also equal to each other, so that the two-dimensional grating 120 of the light guide 100 may be easily fabricated and prepared.

During specific disposition of the first distance Pm and the second distance Pn, a value of the first distance Pm is between 100 nm and 1000 nm, and a value of the second distance Pn is between 100 nm and 1000 nm. Further, the value of the first distance Pm is between 200 nm and 600 nm, and may be specifically a value such as 300 nm, 400 nm, 430.5 nm, or 600 nm; and the value of the second distance Pn is between 200 nm and 600 nm, and may be specifically a value such as 250 nm, 300 nm, 400 nm, 442.5 nm, 500 nm, 550 nm, or 600 nm. This is not limited in this application.

Figure 13:
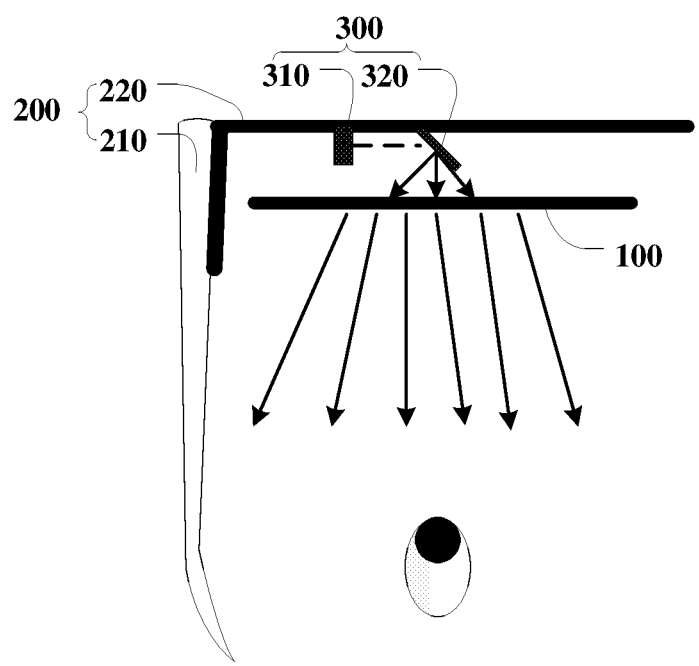
FIG. 13 is a schematic diagram of a structure of a near-eye display apparatus according to an embodiment of this application.

This application further provides a near-eye display apparatus. FIG. 13 is a schematic diagram of a structure of a near-eye display apparatus according to an embodiment of this application. As shown in FIG. 13, the near-eye display apparatus in this embodiment of this application includes the light guide 100 in any one of the foregoing embodiments, and further includes a housing 200 and an optical receiver/transmitter 300. The optical receiver/transmitter 300 and the light guide 100 are disposed at the housing 200. Specifically, the optical receiver/transmitter 300 is configured to generate a light ray, and emit the light ray to a light ingress area 130 of the light guide 100; and the light ray is expanded by the light guide 100, then emitted out, and then received by a human eye, so that a user can obtain a picture 01. Specifically, the light ray may be a light ray of the picture 01, and may include red light, green light, and blue light. According to the light guide 100 in the technical solutions of this application, the picture 01 having the three colors of light rays may be emitted, with a relatively large field of view, out of the light guide 100 using merely one light guide plate 110. Therefore, a structure of the near-eye display apparatus is simplified, and a field of view of the near-eye display apparatus is improved, thereby improving user experience.

In a specific embodiment, the near-eye display apparatus may be augmented reality (AR) glasses, virtual reality (VR) glasses, or the like. This is not specifically limited herein.

Refer to FIG. 13 again. The housing 200 of the near-eye display apparatus in this embodiment of this application may include structures such as a leg 210 (or a binding strap) of glasses and a frame 220 of the glasses. The leg 210 of the glasses and the frame 220 of the glasses may be arranged in any proper form or appearance.

Refer to FIG. 13 again. In a specific embodiment, the optical receiver/transmitter 300 in the near-eye display apparatus includes a laser 310 and a scanner 320. The laser 310 emits a light ray, and the scanner 320 is configured to: scan the light ray emitted by the laser 310, and emit the light ray to the light guide 100. In this embodiment, a laser scanning system including the laser 310 and the scanner 320 is used as an optical receiver/transmitter 300 for projection, and has advantages such as high contrast, a small size, and low power consumption. It may be understood that, in real-word application, the optical receiver/transmitter 300 may be alternatively another system, for example, a liquid crystal on silicon (LCOS) optical receiver/transmitter 300 or a digital light processing (DLP) receiver/transmitter 300. This is not specifically limited herein.

Figure 14:
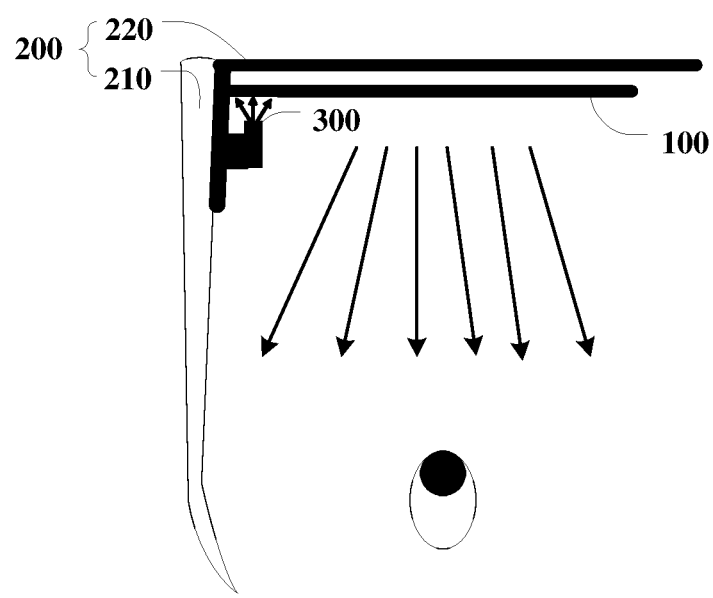
FIG. 14 is another schematic diagram of a structure of a near-eye display apparatus according to an embodiment of this application.

In addition, in FIG. 13, the optical receiver/transmitter 300 is mostly placed on the frame 220 of the glasses. FIG. 14 is another schematic diagram of a structure of a near-eye display apparatus according to an embodiment of this application. Refer to FIG. 14. In real-word application, the optical receiver/transmitter 300 may be alternatively disposed on the leg 210 of the glasses. A position of the optical receiver/transmitter 300 is not limited in this application, provided that positions of the optical receiver/transmitter 300 and the light guide 100 are properly arranged, so that the light ingress area 130 of the light guide 100 is opposite to a light egress area 140 of the optical receiver/transmitter 100, and the light egress area 140 of the light guide 100 is opposite to an area in which the human eye is located. Details are not described herein again.

It is clear that a person skilled in the art may make various modifications and variations to this application without departing from the spirit and scope of this application. This application is intended to cover these modifications and variations of this application provided that they fall within the scope of protection defined by the claims of this application and their equivalent technologies.

What is claimed is:

1. A near-eye display apparatus, comprising:
a housing;
an optical receiver/transmitter; and
a light guide, wherein:
   the optical receiver/transmitter and the light guide are disposed at the housing, and the optical receiver/transmitter is configured to generate a light ray and emit the light ray to a light ingress area of the light guide;
   the light guide comprises a light guide plate and a two-dimensional grating that is disposed on a first surface of the light guide plate, the first surface is closer to an eye than a second surface of the light guide plate when the near-eye display apparatus is worn, the two-dimensional grating comprises a plurality of grating units, the plurality of grating units are arranged at an interval of a first distance along a first direction and are arranged at an interval of a second distance along a second direction, and the first direction intersects with the second direction;
   the two-dimensional grating comprises a light egress area and a light ingress area that are arranged along a third direction, wherein a fourth direction is perpendicular to the third direction, wherein the first direction, the second direction, the third direction, and the fourth direction are located on a same plane, and wherein any two directions of the first direction, the second direction, the third direction, and the fourth direction do not overlap; and
   each grating unit of the plurality of grating units is configured to diffract one incident light beam into at least three emergent light beams, wherein the grating unit is configured to generate a first grating vector, a second grating vector, and a plurality of combined grating vectors, wherein the first grating vector is perpendicular to the first direction, the second grating vector is perpendicular to the second direction, a combined grating vector is a vector sum of the first grating vector at a diffraction order M1 and the second grating vector at a diffraction order M2, and M1 and M2 are integers.

2. The near-eye display apparatus according to claim 1, wherein the first direction and the second direction are symmetric relative to the third direction.

3. The near-eye display apparatus according to claim 1, wherein the two-dimensional grating comprises at least two sub-areas, and grating units in neighboring sub-areas have different forms.

4. The near-eye display apparatus according to claim 1, wherein the plurality of grating units of the two-dimensional grating have a same form.

5. The near-eye display apparatus according to claim 1, wherein an included acute angle between the first direction and the fourth direction is between 10° and 80°, and an included acute angle between the second direction and the fourth direction is between 10° and 80°.

6. The near-eye display apparatus according to claim 1, wherein a field of view of a picture transmitted by the light guide is at least 60°.

7. The near-eye display apparatus according to claim 1, wherein the optical receiver/transmitter comprises a liquid crystal on silicon (LCOS) optical receiver/transmitter or a digital light processing optical receiver/transmitter.

8. The near-eye display apparatus according to claim 1, wherein the light ray generated by the optical receiver/transmitter comprises red light, green light, and blue light.

9. The near-eye display apparatus according to claim 1, wherein the two-dimensional grating comprises at least two sub-areas, first distances of neighboring sub-areas are different, and second distances of the neighboring sub-areas are different.

10. The near-eye display apparatus according to claim 9, wherein the two-dimensional grating comprises a first sub-area and a second sub-area, the light ingress area and the light egress area are located in the first sub-area, the second sub-area is located on a side that is of the light egress area and that is away from the light ingress area, the first distance of the first sub-area is greater than the first distance of the second sub-area, and the second distance of the first sub-area is greater than the second distance of the second sub-area.

11. The near-eye display apparatus according to claim 9, wherein the first distance is between 200 nm and 600 nm, and the second distance is between 200 nm and 600 nm.

12. The near-eye display apparatus according to claim 1, wherein:
a grating unit in the light ingress area is configured to receive a light ray, and after being expanded inside the light guide plate by the grating unit in the light ingress area, the light ray is emitted out of a grating unit in the light egress area; and
after being emitted to the grating unit in the light ingress area, the light ray is transmitted under the effect of the first grating vector, the second grating vector, and the combined grating vector, and a vector sum of grating vectors of the light ray during the transmission is zero.

13. The near-eye display apparatus according to claim 12, wherein the diffraction order M1 comprises −3, −2, −1, 0, 1, 2, and 3, and the diffraction order M2 comprises −3, −2, −1, 0, 1, 2, and 3.

14. The near-eye display apparatus according to claim 1, wherein the near-eye display apparatus comprises virtual reality glasses or augmented reality glasses.

15. The near-eye display apparatus according to claim 14, wherein the optical receiver/transmitter comprises a laser, a scanner, and a controller, and the scanner is configured to:
scan an incident ray emitted by the laser; and
send the incident ray to the light guide.

16. A light guide, comprising:
a light guide plate; and
a two-dimensional grating that is disposed on a first surface of the light guide plate, wherein:
the first surface is closer to an eye than a second surface of the light guide plate when the light guide is in use,
the two-dimensional grating comprises a plurality of grating units, the plurality of grating units are arranged at an interval of a first distance along a first direction and are arranged at an interval of a second distance along a second direction, and the first direction intersects with the second direction;
the two-dimensional grating comprises a light egress area and a light ingress area that are arranged along a third direction, a fourth direction is perpendicular to the third direction, the first direction, the second direction, the third direction, and the fourth direction are located on a same plane, and any two directions of the first direction, the second direction, the third direction, and the fourth direction do not overlap; and
each grating unit of the plurality of grating units is configured to diffract one incident light beam into at least three emergent light beams, wherein the grating unit is configured to generate a first grating vector, a second grating vector, and a plurality of combined grating vectors, wherein the first grating vector is perpendicular to the first direction, the second grating vector is perpendicular to the second direction, a combined grating vector is a vector sum of the first grating vector at a diffraction order M1 and the second grating vector at a diffraction order M2, and M1 and M2 are integers.

17. The light guide according to claim 16, wherein the first direction and the second direction are symmetric relative to the third direction.

18. The light guide according to claim 16, wherein the two-dimensional grating comprises at least two sub-areas, and grating units in neighboring sub-areas have different forms.

19. The light guide according to claim 16, wherein the plurality of grating units of the two-dimensional grating have a same form.

20. The light guide according to claim 16, wherein the two-dimensional grating comprises at least two sub-areas, first distances of neighboring sub-areas are different, and second distances of the neighboring sub-areas are different.

* * * * *